United States Patent [19]

Egbert

[11] 4,365,977

[45] Dec. 28, 1982

[54] DRILLING MUD DEGASSER

[75] Inventor: Gary L. Egbert, Houston, Tex.

[73] Assignee: NL Industries, Inc., New York, N.Y.

[21] Appl. No.: 231,150

[22] Filed: Feb. 3, 1981

[51] Int. Cl.$^3$ .............................................. B01D 19/00
[52] U.S. Cl. ........................................ 55/41; 55/52; 55/55; 55/192; 55/203
[58] Field of Search ...................... 55/41, 52, 55, 176, 55/177, 184, 190–194, 199, 201, 203

[56] References Cited

U.S. PATENT DOCUMENTS

| | | | |
|---|---|---|---|
| 2,216,542 | 10/1940 | Paige | 55/52 |
| 2,455,681 | 12/1948 | Kantor et al. | 55/55 X |
| 2,869,673 | 1/1959 | Erwin | 55/192 |
| 3,112,191 | 11/1963 | Anderson | 55/194 |
| 3,226,916 | 1/1966 | Bradford et al. | 55/193 |
| 3,271,929 | 9/1966 | Bowden et al. | 55/52 |
| 3,358,425 | 12/1967 | Burnham, Sr. | 55/55 X |
| 3,363,404 | 1/1968 | Griffin et al. | 55/192 X |
| 3,407,569 | 10/1968 | Hendricks | 55/192 |
| 3,517,487 | 6/1970 | Burnham, Sr. | 55/192 |
| 3,676,984 | 7/1972 | Clark | 55/193 |
| 3,769,779 | 11/1973 | Liljestrand | 55/192 X |
| 3,973,930 | 8/1976 | Burgess | 55/41 |

FOREIGN PATENT DOCUMENTS 809430  2/1959  United Kingdom .................. 55/192

Primary Examiner—Robert H. Spitzer

[57] ABSTRACT

Disclosed are an apparatus and method for degassing drilling mud. The apparatus includes a pressure vessel having an inlet and an outlet. A vertically oriented tube is axially rotatably mounted within the pressure vessel. The tube has an open lower end communicating with the inlet and a closed upper end having a plurality of ports therebelow. A rotor is mounted to the tube for rotation therewith and includes an upwardly facing conical surface below the ports which slopes upwardly and outwardly toward a rim. An impingement ring is mounted within the pressure vessel about and radially spaced apart from the rim. An upwardly facing conical film tray is mounted within the pressure vessel below the rotor and impingement ring and has a surface sloping downwardly and inwardly toward a central opening. A collecting bowl is mounted below the central opening for rotation with the tube. The collecting bowl includes an upwardly and inwardly turned wall. A pickup tube is mounted within the pressure vessel for communication with the outlet of the pressure vessel. The pickup tube includes an inlet positioned within the collecting bowl adjacent the wall. A pump is provided for creating a substantial vacuum within the pressure vessel and a motor is provided to rotate the tube, thereby to rotate the rotor and collecting bowl.

8 Claims, 4 Drawing Figures

FIG. 3
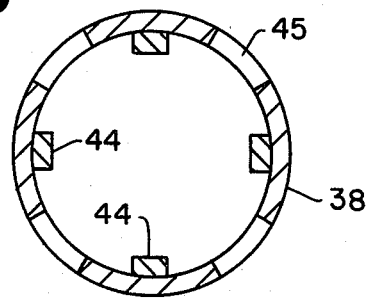
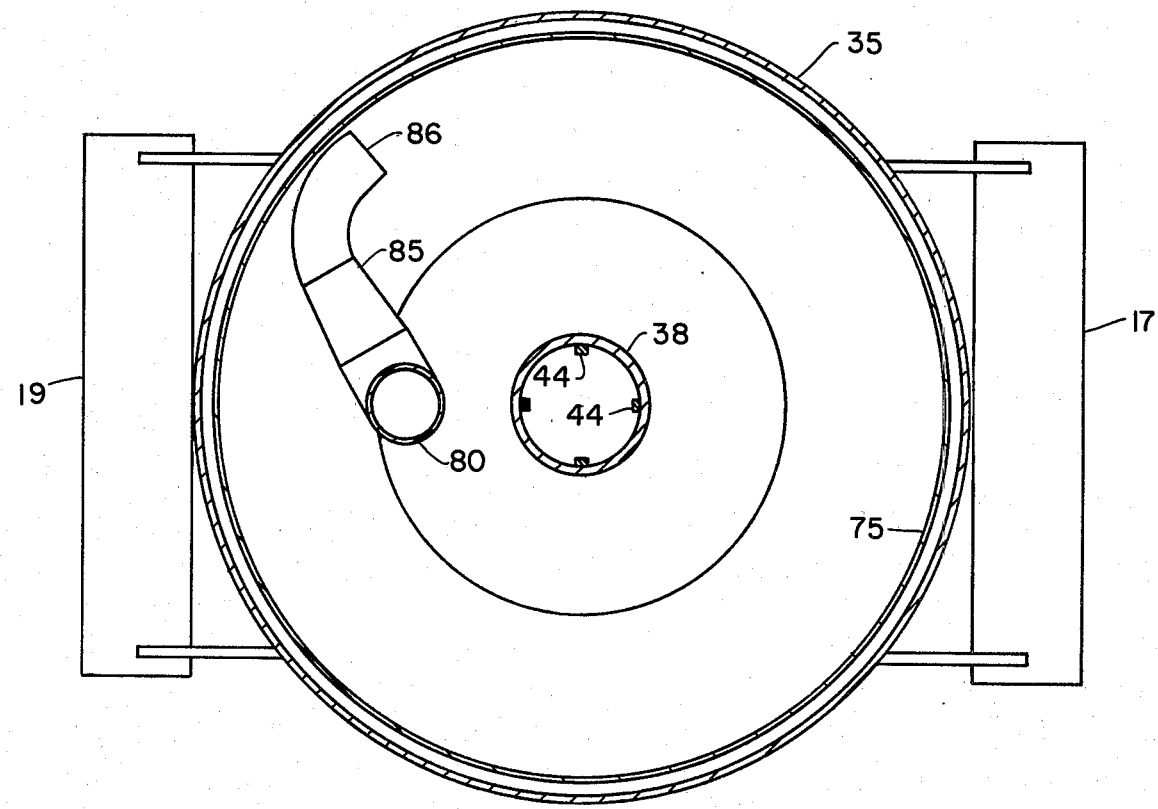
FIG. 4

DRILLING MUD DEGASSER

BACKGROUND OF THE INVENTION

1. Field of the Invention

The present invention relates generally to apparatus and methods for removing entrained gas from liquids, and more particularly to an apparatus and method for removing entrained gas from drilling mud.

2. Description of the Prior Art

During the drilling of oil and gas wells, gas bearing zones are often encountered. When the pressure head of the mud column is less than the pressure of the gas in a particular formation, gas will migrate into and become entrained in the mud. The presence of entrained gas decreases the density of the mud. If the gas cut mud is pumped back into the well, the mud column will weigh less, which will allow even more gas to become entrained, thereby further lowering the density of the mud. If entrained gas is not removed from the mud prior to its being pumped back into the well, a kick or blow out may result.

The prior art has provided numerous methods and apparatus for removing entrained gas from drilling mud. Such apparatus and methods typically employ one or a combination of four distinct separation mechanisms, which include centrifugal separation, impingement of the mud against a barrier to break out gas bubbles, thin film flow to increase surface area, and vacuum separation.

Certain apparatus and methods of the prior art employ more than one of the four primary separation mechanisms; however, none of the such apparatus and methods employ all of the primary separations mechanisms. Moreover, none of the apparatus and methods of the prior art are effective to remove more than about 85%-90% of the entrained gas in drilling mud.

It is therefore an object of the present invention to provide an improved method and apparatus for degassing drilling mud. It is a further object of the present invention to provide a method and apparatus that combines all of the primary separation mechanism.

SUMMARY OF THE INVENTION

Briefly stated, the foregoing and other objects of the present invention are accomplished by providing an apparatus which includes a pressure vessel having an inlet that may be positioned to receive gas cut mud from a first tank and an outlet that may be positioned to discharge degassed drilling mud into a second tank. A vacuum pump is provided to create a substantial vacuum in the pressure vessel, which causes mud to flow into the pressure vessel through the inlet and aides in removing gas from the mud within the pressure vessel. A rotor is mounted for rotation about a vertical axis in the pressure vessel. The rotor has a conical surface that extends radially outwardly from its axis and upwardly toward a rim.

Drilling mud is deposited upon the surface of the rotor by a tube connected to the rotor for rotation therewith. The tube includes a portion extending above the surface of the rotor, which portion includes a plurality of ports positioned for the flow of drilling mud onto the surface. The tube is connected to the pressure vessel inlet, and the vacuum within the pressure vessel inlet causes the mud to be drawn up through the tube and out the ports onto the surface of the rotor. Means are provided for imparting rotation to the mud flowing up through the tube toward the port, thereby to subject the flowing mud to centrifugal forces within the tube while simultaneously aiding in lifting the mud. The rotation imparting means includes a plurality of axial vanes extending radially inwardly inside the tube.

Means are provided for rotating the rotor about its axis to accelerate and force drilling mud deposited thereon up the surface toward the rim. The mud on the rotor is violently accelerated and subjected to extreme shearing forces, which cause turbulent flow, thereby enhancing the removal of entrained gas.

The mud, upon reaching the rim, is propelled radially outwardly to impinge upon an impingement ring, which is mounted within the pressure vessel around and radially spaced apart from the rim. The impingement of the mud on the impringement ring causes additional quantities of gas to be removed.

After impinging upon the ring the mud falls onto a downwardly sloping conical tray. The mud travels in a thin film inwardly and downwardly to a central opening where it falls from the tray. By flowing the mud in a thin film new surfaces of the mud are continually exposed to the vacuum so that any remaining gas is removed.

A collecting bowl is rotatably mounted within the pressure vessel beneath the central opening of the film tray. The collecting bowl has a upwardly and inwardly turned wall. A pickup tube is mounted in the pressure vessel and has an inlet positioned adjacent to the wall of the collecting bowl. Rotation of the collecting bowl imparts centrifugal acceleration to the mud causing the mud to travel outwardly to collect along the wall of the bowl where it is picked up by the pickup tube. The centrifugal force acting on the mud collected against the wall of the bowl causes the pressure in the mud to rise above atmospheric pressure. The velocity energy of the mud in the rotor is converted to additional pressure as the mud jets into the pickup table. The pickup tube is connected to the pressure vessel outlet to discharge mud to the mud discharge tank.

BRIEF DESCRIPTION OF THE DRAWINGS

FIG. 3 is a section view along line 3—3 of FIG. 2 showing details of the inlet tube of the apparatus of the present invention.

FIG. 4 is a section view taken along line 4—4 of FIG. 2 showing details of the collecting bowl and pickup tube of the present invention.

DESCRIPTION OF THE PREFERRED EMBODIMENT

Figure 1:
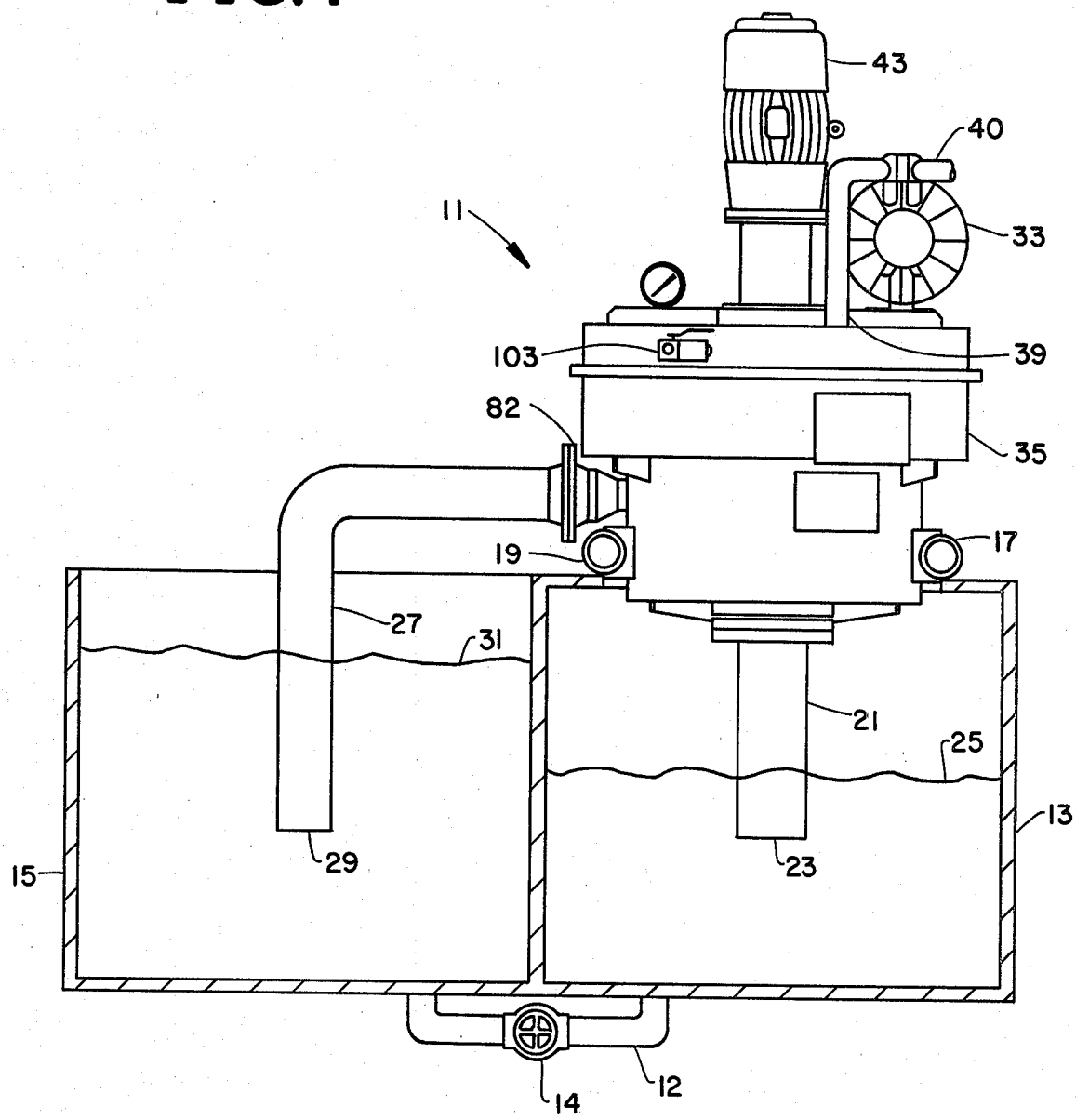
FIG. 1 is an elevation view of a portion of a drilling mud system incorporating the degasser of the present invention.

Referring now to the drawings, and first to FIG. 1, the degasser of the present invention is designated generally by the numeral 11. Degasser 11 is adapted for use in a mud system that includes a first tank 13 and a second tank 15. First tank 13 is adapted to receive gas cut mud from the well and second tank 15 is adapted to receive degassed mud from degasser 11. Tanks 13 and 15 are connected together by a conduit 12 which includes a normally closed valve 14. Valve 14 may be opened in order to allow recirculation between tanks 15 and 13.

Degasser 11 is mountable over first tank 13 on a pair of support members 17 and 19. Degasser 11 includes an inlet conduit 21 having an opening 23 submergible below the level of drilling mud in tank 13, which level is designated by the numeral 25. Degasser 11 also includes an outlet conduit 27 having an opening 29 which is submergible below the level of drilling mud in tank 15, which level is designated by the numeral 31. Drilling mud is withdrawn from first tank 13 through conduit 21 into degasser 11 by a vacuum pump 33 where the mud is degassed in a manner that will be discussed in greater detail. Degassed mud is discharged from degasser 11 through outlet conduit 27 into second tank 15.

Figure 2:
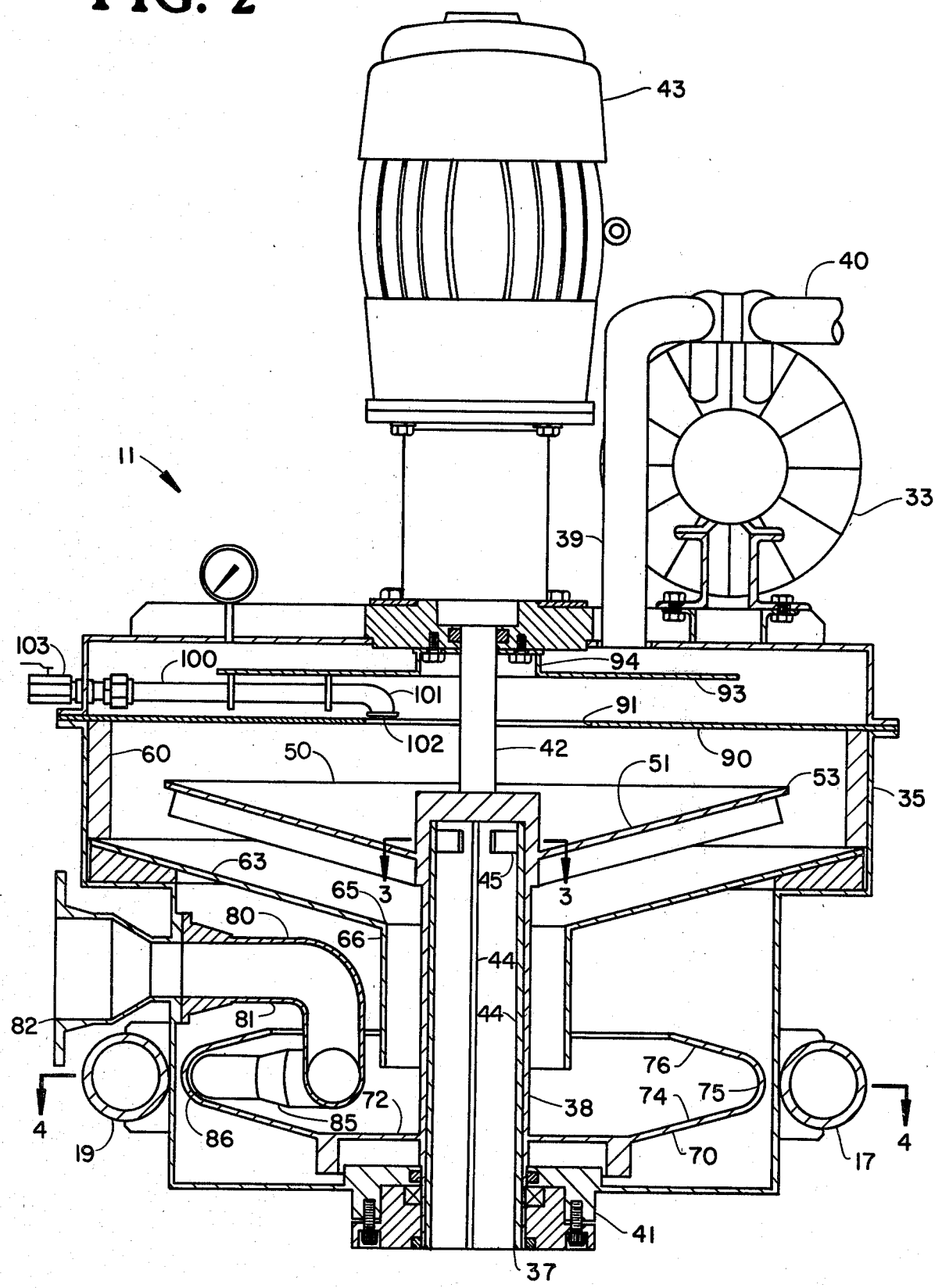
FIG. 2 is a partial section view of the degasser of the present invention.

Referring now to FIG. 2, degasser 11 includes a pressure vessel 35. Gas cut mud is introduced into the interior of the pressure vessel 35 through a tube 38, which has an inlet 37 that is connectable with inlet tube 21, as shown in FIG. 1. Drilling mud is pulled upwardly through tube 38 by the vacuum produced within pressure vessel 35 by vacuum pump 33, which is connected to pressure vessel 35 by a vacuum conduit 39. In the preferred embodiment, vacuum pump 33 has the capacity to pull a vacuum on the order of 10 inches of mercury within pressure vessel 35. Gasses are exhausted from pressure vessel 35 through an exhaust conduit 40, which may be connected to a flare or other gas disposal.

Tube 38 is rotatably mounted within pressure vessel 35 by lower support bearing assembly 41. Suitable seals are provided between lower support bearing assembly 41 and tube 38 in order to maintain the vacuum within pressure vessel 35. A drive shaft 42 is connected coaxially to tube 38. A motor 43 is connected to shaft 42, thereby to rotate shaft 42 and tube 38. In the preferred embodiment, motor 43 is adapted to rotate tube 38 at approximately 1100 rpm. The rotation of tube 38 imparts rotation to the drilling mud flowing upwardly therethrough, which effects primary centrifugal separation of the gas entrained in the mud. The rotation of tube 38 also aides in the lifting of the drilling mud due to the centrifugal forces thereon.

As best shown in FIGS. 2 and 3, tube 38 includes a plurality of axial radially inwardly extending vanes 44, there being four such vanes in the preferred embodiment. Vanes 44 function to transfer more effectively the rotational forces from the interior of tube 38 to the drilling mud flowing therethrough, and thereby increase the centrifugal forces on the mud. Tube 38 also includes near the top thereof a plurality of ports 45, there being four such ports in the preferred embodiment.

Due to the rotation of tube 38 and the mud therein, mud reaching windows 45 is hurled tangentially outward through ports 45 onto a rotor 50 which is connected to and rotatable with tube 38. Rotor 50 has a conical surface 51 that slopes radially outwardly and upwardly toward a rim 53. The mud deposited on rotor 50 is forced centrifugally outwardly and upwardly along surface 51 toward rim 53 in a dynamic thin film of decreasing thickness. Because the linear velocity of rotor 50 increases toward rim 53, the mud on surface 51 is constantly and violently accelerated. Such acceleration produces high shearing forces and turbulence within the thin film of mud spreading along surface 51, which enhances the removal of gas entrained therein.

The mud upon reaching rim 53 of rotor 50 is hurled at very high speeds radially into an impingement ring 60 which is mounted circumferentially about pressure vessel 35 and spaced radially apart from rim 53. The mud dashed against impingement ring 35 is broken up into fine droplets and additional quantities of gas are drawn out of the mud. Because of the abrasive nature of the mud and the high speed at which the mud is hurled from rim 53, impingement ring 60 is replaceable and formed from a wear resistant material, as for example polyurethane.

After impingement upon wear ring 60, the mud falls downwardly onto a drip tray 63. Drip tray 63 has a conical surface that slopes downwardly and inwardly toward a central opening 65 having a downwardly directed conduit 66 depending therefrom. Drilling mud that falls onto the surface of drip tray 63 flows in a static thin film toward central opening 65. As the mud flows along the surface of drip tray 63, additional quantities of gas are removed.

When the mud reaches central opening 65, it flows downwardly through conduit 66 and into a collection bowl 70. Collection bowl 70 is connected to tube 38 and rotatable therewith. Collection bowl 70 includes a flat bottom surface and a wall which includes a first upwardly sloping portion 74, an arcuate portion 75, and an inturned portion 76. The mud deposited on flat surface 72 of collection bowl 70 is forced centrifugally outwardly by the rotation of collection bowl 70 on tube 38 to collect in arcuate portion 75. Additional quantities of gas may be removed from the mud due to the centrifugal forces in collection bowl 70.

Referring now particularly to FIGS. 2 and 4, mud collected in arcuate portion 75 is discharged from pressure vessel 35 through a pickup tube 80. Pickup tube 80 includes an elbow portion 81 which extends from an outlet 82, which is connectable to outlet conduit 27 as shown in FIG. 1, into collection bowl 70. Pickup tube 80 also includes a scavenging portion 85 which extends laterally outwardly from elbow portion 81. Scavenging portion 85 has an inlet 86 which is disposed closely adjacent arcuate portion 75 of the wall of collection bowl 70 and is directed against the direction of rotation of collection bowl 70. The high angular velocity of collection bowl 70 during operation exerts substantial centrifugal forces on the mud collected against arcuate portion 75, which forces generate a mud pressure greater than one atmosphere, thereby forcing mud into inlet 86. Additional pressure is provided by the kinetic energy of the mud.

In order to prevent the entry of mud droplets into vacuum pump 33, a baffle arrangement is provided in pressure vessel 35 above rotor 50. The baffle arrangement includes a primary baffle plate 90 which extends radially inwardly from pressure vessel 35 above impingement ring 60 to a central opening 91 around shaft 42. The baffle arrangement further includes a second baffle plate 93 which extends radially outwardly from a mounting bracket 94 about shaft 42. Gas removed from the drilling mud travels in a tortuous path first radially inwardly through central opening 91, then radially outwardly around secondary baffle plate 93 and finally radially inwardly to vacuum conduit 39.

In order to clean out degasser 11 periodically, a washing system 100 is provided. Washing system 100 includes a faucet 101 supported by secondary baffle plate 93 and having an outlet 102 positioned radially interior of central opening 91 in primary baffle plate 90. A valve and hose connection 103 is positioned exterior of pressure vessel 35, through which fresh water may be introduced into degasser 11 through faucet 101.

In operation, degasser 11 is mounted over first tank 13 with inlet 23 of intake conduit 21 positioned below the surface of 25 of the gas cut mud. Outlet conduit 27 is positioned in second tank 15 with outlet 29 below mud level 31. With degasser 11 so positioned, motor 43 is actuated to rotate shaft 42, which inturn rotates shaft 38 together with rotor 50 and collection bowl 70. Vacuum pump 33 is then actuated to draw gas cut mud upwardly through inlet conduit 21 into tube 38. It will be noted that the vacuum within pressure vessel 35 will also tend to draw mud from tank 15 upwardly through outlet conduit 27 and into collection bowl 70 through pickup tube 80. However, any such mud from tank 15 will be forced out of degasser 35 by the rotation of collection bowl 70.

As the mud flows upwardly through tube 38, vanes 44 impart rotation to the mud and primary centrifugal separation of gas occurs. Mud and separated gas flow outwardly through ports 45, where the mud is deposited upon surface 51 of rotor 50. The mud is accelerated violently by rotor 50 in an outward path on surface 51 toward rim 53. The mud spreads in a turbulent thin film over surface 51 and is subjected to violent shearing forces and acceleration. The shearing forces and turbulent flow in the thin film over surface 51 cause substantial quantities of gas to be released from the mud.

Upon reaching rim 53 of rotor 50, the mud is hurled at high speeds radially outwardly where it is dashed violently against impingement ring 60. The impingement of the mud on impingement ring 60 causes the mud to be broken into small droplets and breaks out further quantities of gas.

After impingement upon impingement ring 60, the mud falls onto drip tray 63 where it flows in a thin film toward central opening 65. The thin film flow on drip tray 63 allows any remaining quantities of gas to be separated from the mud.

Upon reaching central opening 65, the mud falls through conduit 66 into collection bowl 70. The rotation of collection bowl 70 causes the mud to collect about the wall of collection bowl in arcuate portion 75. The mud is centrifugally forced into pickup tube 80 and out of pressure vessel 35 through outlet conduit 27.

The degasser of the present invention is operable without the need for a mud level sensor. The rate of flow into degasser 11 is determined by hydrostatic conditions; namely by the weight of the mud and the difference in elevation between mud level 25 in tank 13 and ports 45 in tube 38. Because of the arrangement of pickup tube 80 and collection bowl 70, all mud flowing into collection bowl 70 is substantially immediately discharged into second tank 15.

Further modifications and alternative embodiments of the apparatus and method of this invention will be apparent to those skilled in the art in view of this description. Accordingly, this description is to be construed as illustrative only and is for the purpose of teaching those skilled in the art the manner of carrying out the invention. It is to be understood that the forms of the invention herewith shown and described are to be taken as the presently preferred embodiment. Various changes may be made in the shape, size, and arrangement of parts. For example, equivalent elements or materials may be reversed, and certain features of the invention may be utilized independently of the use of other features, all as would be apparent to one skilled in the art after having the benefit of this description of the invention.

What is claimed is:

1. A drilling mud degasser, which comprises:
   a pressure vessel;
   means for creating a substantial vacuum in said pressure vessel;
   a rotor having a vertically oriented axis rotatably mounted in said pressure vessel, said rotor having a conical surface which extends radially outwardly from said axis and upwardly toward a rim;
   means for depositing drilling mud on said surface of said rotor;
   means for rotating said rotor about said axis to accelerate and force drilling mud deposited on said surface in a turbulent thin film upwardly and outwardly on said surface toward said rim;
   an impingement ring mounted within said pressure vessel about and radially spaced apart from said rim for the impingement thereon of drilling mud from said rotor;
   and means for collecting drilling mud impinged upon said impingement ring.

2. The drilling mud degasser as claimed in claim 1, wherein said depositing means includes:
   a tube connected to said rotor for rotation therewith, said tube having a port positioned above said surface for the flow of drilling mud onto said surface.

3. The drilling mud degasser as claimed in claim 2, including means for imparting rotation to drilling mud flowing through said tube toward said port, thereby to subject said flowing mud to centrifugal force within said tube.

4. The drilling mud degasser as claimed in claim 3, wherein said rotation imparting means includes a plurality of axial vanes extending inwardly in said tube.

5. The drilling mud degasser as claimed in claim 1, wherein said drilling mud collecting means includes:
   a downwardly and inwardly sloping conical film tray mounted within said pressure vessel below said impingement ring upon which drilling mud impinged upon said impingement ring flows in a thin film;
   and means for discharging from said pressure vessel drilling mud collected on said film tray.

6. The drilling mud degasser as claimed in claim 5, wherein said film tray includes opening for the flow of drilling mud therethrough, and said drilling mud discharging means includes:
   a collecting bowl rotatably mounted within said pressure vessel beneath said central opening, said collecting bowl having a wall thereabout;
   means for rotating said collecting bowl to cause drilling mud therein to travel outwardly to collect along said wall;
   and a pickup tube, having an inlet positioned adjacent said wall to pick up drilling mud collected along said wall and an outlet positioned to discharge drilling mud exterior of said pressure vessel.

7. A drilling mud degasser, which comprises:
   a pressure vessel having an inlet and an outlet;
   means for creating a substantial vacuum in said pressure vessel;
   a vertically oriented tube axially rotatably mounted within said pressure vessel, said tube having an open lower end communicating with said inlet and a closed upper end having a plurality of ports therebelow;
   a rotor mounted to said tube for rotation therewith, said rotor including an upwardly facing conical surface below said ports, said surface of said rotor sloping inwardly and outwardly toward a rim;

an impingement ring mounted within said pressure vessel about and radially spaced apart from said rim;

an upwardly facing conical film tray mounted within said pressure around said tube and below said rotor and impingement ring, said film tray having a surface sloping downwardly and inwardly toward a central opening about said tube;

a collecting bowl within said pressure vessel below said central opening connected to said tube for rotation therewith, said collecting bowl including an upwardly and inwardly turn wall;

a pickup tube having an outlet mounted within said pressure vessel for communication with said outlet of said pressure vessel, and an inlet positioned within said collecting bowl adjacent said wall;

and means for rotating said tube thereby to rotate said rotor and collecting bowl.

8. A method for degassing a drilling mud containing entrained gas, said method comprising:

(a) flowing a drilling mud containing entrained gas upwardly in a vertical, cylindrical inlet zone under conditions of centrifugal rotation and substantial vacuum for disengaging gas therefrom and for introducing said mud into a conical degassing zone having a downwardly directed apex located within a degassing vessel maintained at a substantial vacuum;

(b) centrifugally rotating said mud in said conical degassing zone, forming a thin, turbulent film of said mud flowing radially upward and outward for disengaging gas therefrom and imparting radial momentum to said mud;

(c) impinging said radially flowing mud upon an impingement ring within said degassing vessel for desengaging gas therefrom and stopping said mud's radial flow;

(d) removing degassed mud from said degassing vessel; and (e) removing disengaged gas from said degassing vessel.

* * * * *